United States Patent
Son et al.

(10) Patent No.: US 6,201,957 B1
(45) Date of Patent: Mar. 13, 2001

(54) SYSTEM AND METHOD FOR IMPLEMENTING FLEXIBLE CALLING PLANS

(75) Inventors: William Y. Son, San Diego; Yeong Jee Chung, La Jolla; Jong T. Chung, San Diego, all of CA (US)

(73) Assignee: Neopoint, Inc., La Jolla, CA (US)

( * ) Notice: Subject to any disclaimer, the term of this patent is extended or adjusted under 35 U.S.C. 154(b) by 0 days.

(21) Appl. No.: 09/195,567

(22) Filed: Nov. 18, 1998

(51) Int. Cl.⁷ .................................................. H04Q 7/20
(52) U.S. Cl. ........................ 455/406; 455/407; 455/408
(58) Field of Search ........................... 455/406, 407, 455/408, 414

(56) References Cited

U.S. PATENT DOCUMENTS

| | | |
|---|---|---|
| 5,444,765 | 8/1995 | Marui et al. ............................. 379/59 |
| 5,488,655 | 1/1996 | Hamlen ................................. 379/114 |
| 5,553,131 * | 9/1996 | Minervino, Jr. et al. ............ 379/221 |
| 5,568,153 | 10/1996 | Béliveau ............................... 342/357 |
| 5,577,100 | 11/1996 | McGregor et al. ..................... 379/58 |
| 5,600,706 | 2/1997 | Dunn et al. ............................. 379/59 |
| 5,787,354 | 7/1998 | Gray et al. ............................ 455/456 |
| 5,796,790 * | 8/1998 | Brunner ................................. 379/59 |
| 5,815,561 * | 9/1998 | Nguyen et al. ....................... 379/115 |
| 5,915,214 * | 6/1999 | Reece et al. .......................... 455/406 |
| 6,018,652 * | 1/2000 | Frager et al. ......................... 455/406 |

* cited by examiner

Primary Examiner—Daniel S. Hunter
Assistant Examiner—Thuan T. Nguyen
(74) Attorney, Agent, or Firm—Lyon & Lyon LLP

(57) ABSTRACT

A system and method for providing one or more tiers of alternative rates or rate plans to wireless telephone subscribers utilizes one or more home regions, in which the subscriber can make and receive wireless calls at reduced service rates. The home regions are preferably defined within the wireless subscriber's local calling area and can be defined as a region in proximity with the subscriber's home, office, or other location. Additionally, a second tier of reduced rate services can be provided in another region referred to as the home-perimeter region. The home-perimeter region, in one embodiment, is a subset of the home region, and preferably covers an area somewhat equivalent to the area covered by the subscriber's conventional land line services. As such, the subscriber can make wireless calls in or near his or her home, office, or other location at rates competitive to those offered by land line service providers.

12 Claims, 10 Drawing Sheets

SYSTEM AND METHOD FOR IMPLEMENTING FLEXIBLE CALLING PLANS

BACKGROUND OF THE INVENTION

1. Field of the Invention

The present invention relates generally to wireless calling services, and more particularly to a system and method for implementing a flexible rate plan for wireless service customers.

2. Related Art

The advent of wireless personal communications devices has revolutionized the telecommunications industry. Cellular and PCS services provide wireless personal communications to businesses and individuals at home, in the office and on the road. Wireless telephone subscribers no longer have to stop at pay telephones along the road, or wait until they return home or to the office. Instead, wireless subscribers carry out their day to day business from their cars, from the jobsite, while walking along the airport concourse, and just about anywhere their signals are accessible.

Thus, it is no surprise that since the introduction of the cellular telephone service, the number of wireless telephone subscribers has increased steadily. Today, the number of wireless telephone subscribers is staggering. However, there still remains an unpenetrated market of potential wireless customers. Additionally, even with current wireless customers, the wireless carriers' market share could be increased. Most wireless carriers charge a flat rate per minute per customer within a BTA or local region, regardless of the actual calling locations within that local region. Generally speaking, that rate is higher than the rate charged by the customer's local landline carrier. As such, the wireless customer tends to use his or her landline service when making calls from the home or office.

SUMMARY OF THE INVENTION

The present invention is directed toward a system and method for providing one or more tiers of alternative rates or rate plans to wireless telephone subscribers. According to the invention, one or more home regions are defined, preferably within the wireless subscriber's local calling area, in which the subscriber can make and receive wireless calls at reduced service rates. The one or more home regions can be defined as a region in proximity with the subscriber's home, office, or other location. In one embodiment, the home region is defined by the area of coverage provided by, for example, one or more cell sites for cellular service or cell-site equivalent in other communications formats. Thus, parameters such as, for example, a base station I.D., sector I.D., or pilot offset, can be used to define the home region as well as identify whether the subscriber is currently in the home region.

Additionally, a second tier of reduced rate services can be provided in another region referred to as the home-perimeter region. The home-perimeter region, in one embodiment, is a subset of the home region, and preferably covers an area somewhat equivalent to the area covered by the subscriber's conventional land line services. As such, the subscriber can make wireless calls in or near his or her home, office, or other location at rates competitive to those offered by land line service providers.

In alternative embodiments, the home area can be different from that covered by the subscriber's conventional land line services. In one embodiment, the home-perimeter region is implemented by allowing the subscriber to use the same equipment or similar equipment to conventional land line equipment, and interface this equipment to the wireless service provider's network.

One advantage of the invention is that wireless service providers can offer rate plans to subscribers that are competitive with those offered by conventional land line services. As a result, when the subscriber is in his or her home-perimeter region, the subscriber may be more motivated or less hesitant to use the wireless service provider to initiate a phone call. Thus, a wireless service provider can increase its market within its existing customer base.

Another advantage of the invention is that interface equipment can be provided such that the subscriber can use conventional land line-type telephone equipment (i.e., conventional cordless or corded telephones) to interface to the wireless service provider in his or her home-perimeter region. As such, the wireless service provider can allow the subscriber to take advantage of the competitive home-perimeter region rates without the subscriber having to invest in substantial amounts of new equipment.

Yet another advantage of the invention is that it allows subscribers to define a home region in which reduced service rates can be provided to a subscriber to further entice the subscriber to use the wireless services when the subscriber is near his or her home, office, or other location. These areas may, for example, be the areas in which the subscriber may put off placing a call until he or she reaches home. However, having a reduced rate within the home region allows the subscriber to make calls within the home region that are at rates that are competitive with or, perhaps, only slightly increased above those of land line service rates. Although any rate plan can be implemented, one example plan is that in which home region rates are less than the wireless carrier's local calling area rates but still greater than the land line service provider's rates, while home-perimeter region rates are extremely competitive with those of land line rates. Such a plan gives the subscriber incentive to use the wireless service provider while at home or in the office or at another home-perimeter location, as well as increased incentive to use the wireless service provider while in his or her home region. As such, the carriers can anticipate an increase in usage by the subscribers because they are more likely to utilize the wireless services in their home region and home-perimeter regions.

Further features and advantages of the invention as well as the structure and operation of various embodiments of the invention are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

1. Overview of the Invention

The present invention is directed toward a system and method for providing multiple tier services to wireless telephone subscribers. According to one embodiment of the invention a home region is defined within the subscriber's local calling region. The home region can be defined, for example, as an area surrounding the subscriber's home, office, or other designated location. While using the wireless service in his or her home region, the wireless subscriber may be provided with rates that are competitive with conventional land-line rates. This provides incentive to the subscriber to use the wireless service instead of his or her landline service.

In one embodiment, more than one home region can be defined so that the subscriber can be provided with the advantage of competitive rates at more than one location. Thus, for example, a subscriber may have two home regions defined: one around his or her home and the other around his or her office. Although the subscriber's home and office are used in this example, other locations can be selected as the home regions.

In one embodiment, home region is defined as a subset or subregion of the subscriber's local calling area. Thus, while in his or her home region the caller may use the wireless service at reduced rates, while elsewhere in the local calling area the subscriber uses the wireless service at nominal local region rates.

In one embodiment, outside the local calling area the subscriber may use the service at higher-than-nominal rates. These higher rates are sometimes referred to as roaming rates. In yet another embodiment, it is possible that a home region may be defined as being partially or wholly within a roaming region.

In one embodiment of the invention, two tiers of reduced-rate service can be provided. At the first tier of reduced-rate service, wireless services are provided to the subscriber at a first reduced rate within the defined home region. In this two-tier embodiment, if the subscriber uses the wireless service in the immediate proximity of his or her home or office, then the service provider can charge an even lower rate which is competitive with the subscriber's landline services. Specifically, this lower reduced rate can be the same as, or close to the landline services rates. Although it is not necessary to provide a two-tier reduced-rate service plan, such a plan provides additional flexibility to the wireless carrier in allowing them to more effectively compete with the landline service providers.

Figure 1:
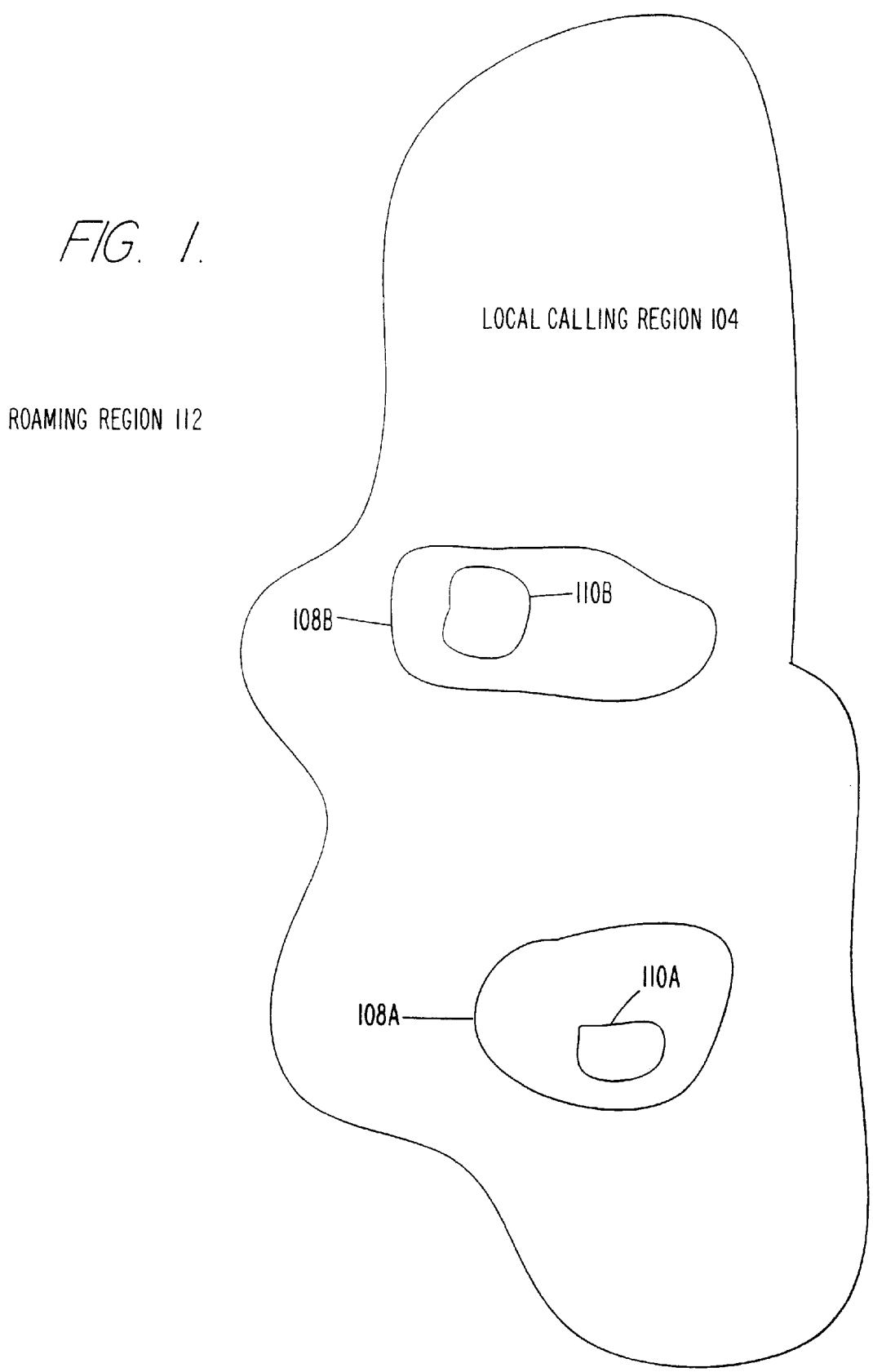
FIG. 1 is a diagram illustrating an example implementation of home regions and home-perimeter regions within a local calling region, according to one embodiment of the invention.

FIG. 1 is a diagram illustrating the concept of defining one or more home regions within a local calling region. Referring now to FIG. 1, a local calling region 104 is defined. Local calling region 104 can, for example, be a region such as that which defines the wireless subscriber's local calling area. In one embodiment, local calling region 104 can be the region in which standard rates apply and can be differentiated from a non-local or roaming region 112 in which higher roaming rates apply. Of course, it is not necessary that the local calling region 104 be defined with respect to a roaming region 112. As would be apparent to one of ordinary skill in the art after reading this description, other criteria can be used for defining a subscriber's local calling region 104.

Also illustrated in FIG. 1 are 2 home regions 108A, 108B. As mentioned above, it is within home regions 108A, 108B that lower rates can be applied for a subscriber's use of the wireless service to allow the wireless service to be more competitive with landline rates while the subscriber is within that home region 108A, 108B. Although 2 home regions 108A, 108B are illustrated in FIG. 1, any number of home regions 108 can be implemented depending on the plan offered by the wireless carrier. In the example illustrated in FIG. 1, one home region 108A is provided in the area of the subscriber's home while the other home region 108B is provided in the area of the subscriber's office. In this example, because more competitive rates would be offered to the subscriber in the area of his or her home or office, the subscriber would be more likely to use the wireless service than he or she would have conventional wireless rates.

Because the invention is not restricted to a particular format of wireless service (i.e., cellular, PCS, etc.), there is a great deal of flexibility that can be provided, depending on the service format, in defining the area covered by home regions 108. For example, with a cellular service, home regions 108 can be defined as the area covered by a particular cell site. Thus, in this embodiment, the cell site within which the subscriber's home or office is located is the cell site that defines home region 108.

Similarly, with other types or formats of wireless services, the area covered by the one or more home regions 108 can be defined based on the units of coverage offered by that type of service. As a further example, with a PCS type of service, the base station ID and sector ID can be used to identify the home region 108. For CDMA (Code Division Multiple Access) systems, the pilot offset can be used to define the home region. As illustrated with the above-listed examples, these or other location-related parameters can be utilized to define the area covered by one or more home regions 108.

Although the examples discussed regarding home regions 108A, 108B refer to those regions as surrounding a subscriber's home or office, home regions 108A, 108B are not limited to these specific examples. As would be apparent to one of ordinary skill in the art, home regions 108A can be defined as covering a location, area or facility desired by the subscriber. Additionally, the examples illustrated in FIG. 1 provide that home regions 108A, 108B reside totally within local calling region 104. It is conceivable that a home region 108 could lie partially inside and partially outside local calling region 104, or that home calling region could lie entirely out of local calling region 104.

Also illustrated in FIG. 1 are home-perimeter regions 110A, 110B. In the embodiment illustrated in FIG. 1, home-perimeter regions 110A, 110B are subsets of home regions 108A, 108B. In a preferred embodiment, home-perimeter regions 110 are defined to be just large enough to approximately cover the area of the subscriber's home, office or other defined location or site. In alternative embodiments, home-perimeter regions 110 can be defined as any subset of home region 108. Preferably, home-perimeter regions 110 are totally contained within home regions 108.

The use of a home-perimeter region 110 provides the capability of offering a two-tier service, wherein further rate reductions can be provided within home-perimeter regions 110. More specifically, in a preferred embodiment of the two-tier arrangement, the lowest rate offered to a subscriber is within home-perimeter region 110, and these rates are quite competitive with rates offered by landline services. These competitive rates do not necessarily have to be lower than or identically equal to rates offered by landline services, but are preferably competitive. These rates can be chosen by the service provider at a price point that the service provider feels is competitive with the landline service providers. In this two-tier arrangement, calls made within home region 108 may be slightly higher than those made within home-perimeter region 110, however still less than calls made within local calling region 104. Although it is not necessary that home-perimeter region 110 be separately defined as a subset of home region 108, this two-tier embodiment allows the service provider to directly compete with landline service providers in areas where the subscriber could otherwise easily take advantage of those landline services within the range of conventional cordless handsets.

Figure 2:
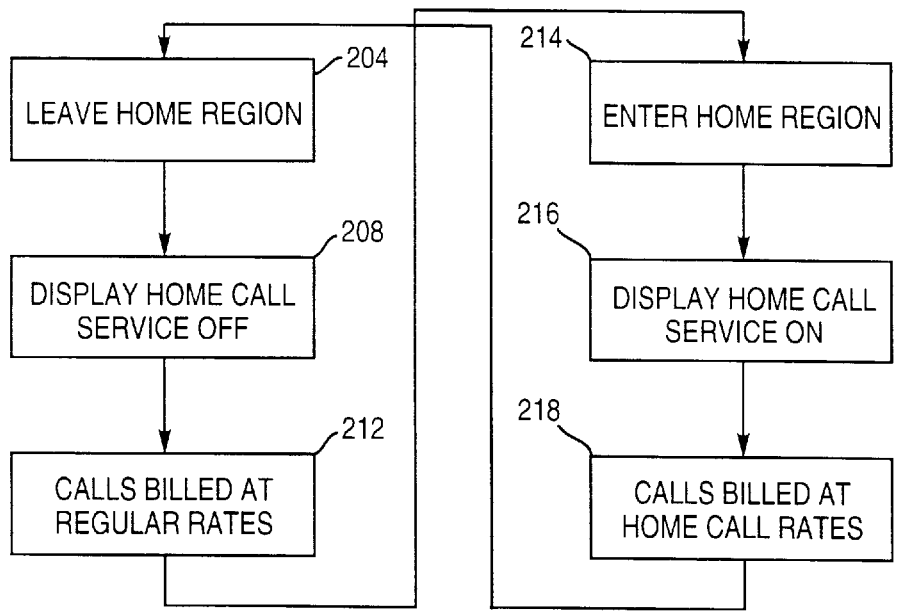
FIG. 2 is an operational flow diagram illustrating a process for changing the mode of the calls based on the subscriber's travels into and out of his or her home regions according to one embodiment of the invention.

There are numerous scenarios, described below, that can be implemented in providing single- or two-tier rate plans to wireless subscribers. FIG. 2 is an operational flow diagram illustrating a simple scenario for providing one such rate plan. Referring now to FIG. 2, in a step 204, a subscriber currently in his or her home region 108 is traveling and leaves that home region 108. In a step 208, a display or other alert mechanism on the telephone notifies the subscriber that he or she has left home region 108. This alert mechanism can be, for example, a display on the handset's LCD or other display, a visual indicator such as a light or other LED, an audible alert, or some other indication to inform the subscriber that he or she has left his or her home region 108.

Now outside of home region 108, calls made or received can be billed at regular rates as illustrated by block 212. Once the subscriber reenters his or her home region 108, as illustrated by step 214, the display or alert indicates that the subscriber has returned to his or her home region as illustrated by step 216, and calls made using the wireless service can be billed at the reduced home region rates.

Figure 3:
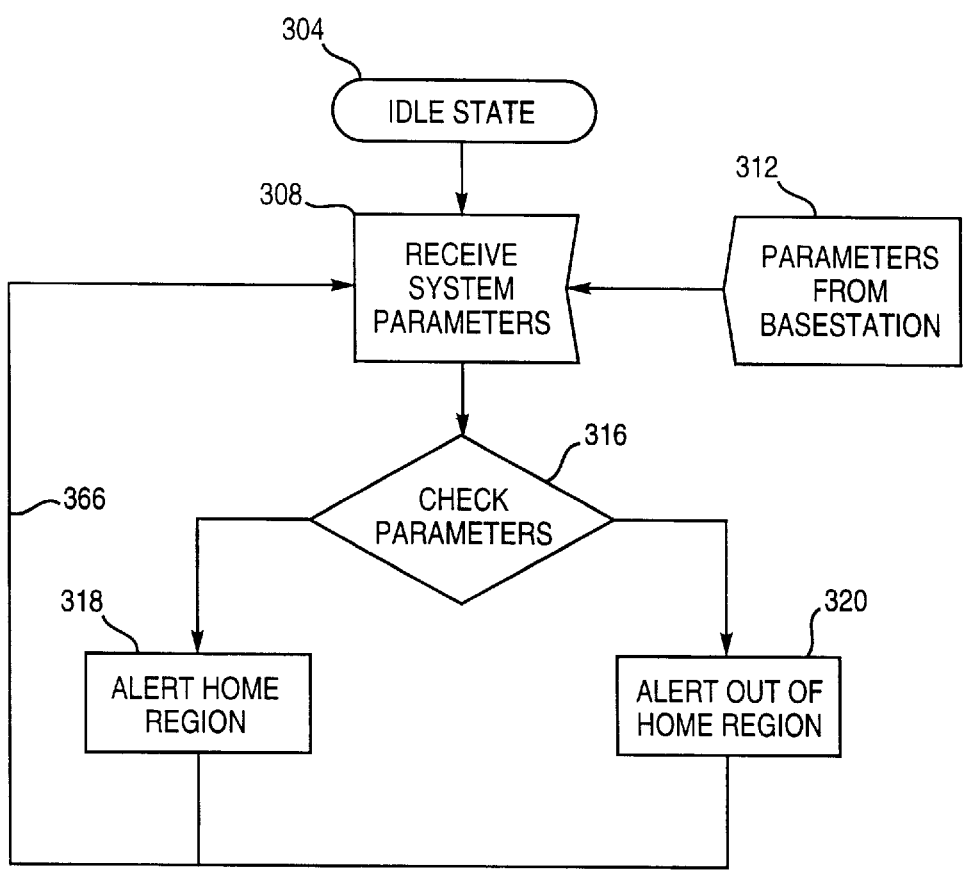
FIG. 3 is an operational flow diagram illustrating a process by which a handset can activate an alert according to one embodiment of the invention.

FIG. 3 is an operational flow diagram illustrating a process by which the handset can activate the alert from steps 208 and 216 according to one embodiment of the invention. In the scenario illustrated in FIG. 3, the handset is in the idle state as illustrated by flow region 304. As the subscriber travels, his or her handset receives system locational parameters from a wireless base station. This is illustrated by steps 308 and 312. System locational parameters can include, for example, a cell site ID, a base station ID, a sector ID, a pilot offset, or additional or alternative parameters depending on the type or format of wireless service utilized and the information associated therewith.

In a step 316, the handset checks the received locational parameters to determine whether the handset is currently in a designated home region 108. If the handset has determined that it is in a home region 108 it generates an alert indicating that the reduced rates apply as illustrated by step 318. Alternatively, if the handset determines that the subscriber has left or is not in a home region 108, it generates an alert indicating that the caller is no longer in one of his or her designated home regions 108 as illustrated by step 320. Preferably, the alert generated is a continuous display on the phone such that the subscriber can always determine whether he or she is inside or outside of his or her home region 108.

Operation continues in this manner as illustrated by flow line 366 where the handset continues to receive parameters and determine whether the handset is in a home region 108. Preferably, the check of system parameters is performed at periodic intervals frequent enough to provide a timely notification to the caller yet not so frequent as to tie up undue processing power simply to continually make the determination. Additionally, a certain level of hysterisis can be built into the system such that on fringe regions the handset is not continually flip-flopping between conventional and home call service. In one embodiment, such hysterisis can be built in by implementing a determined amount of time delay before allowing a service switch.

Figure 4:
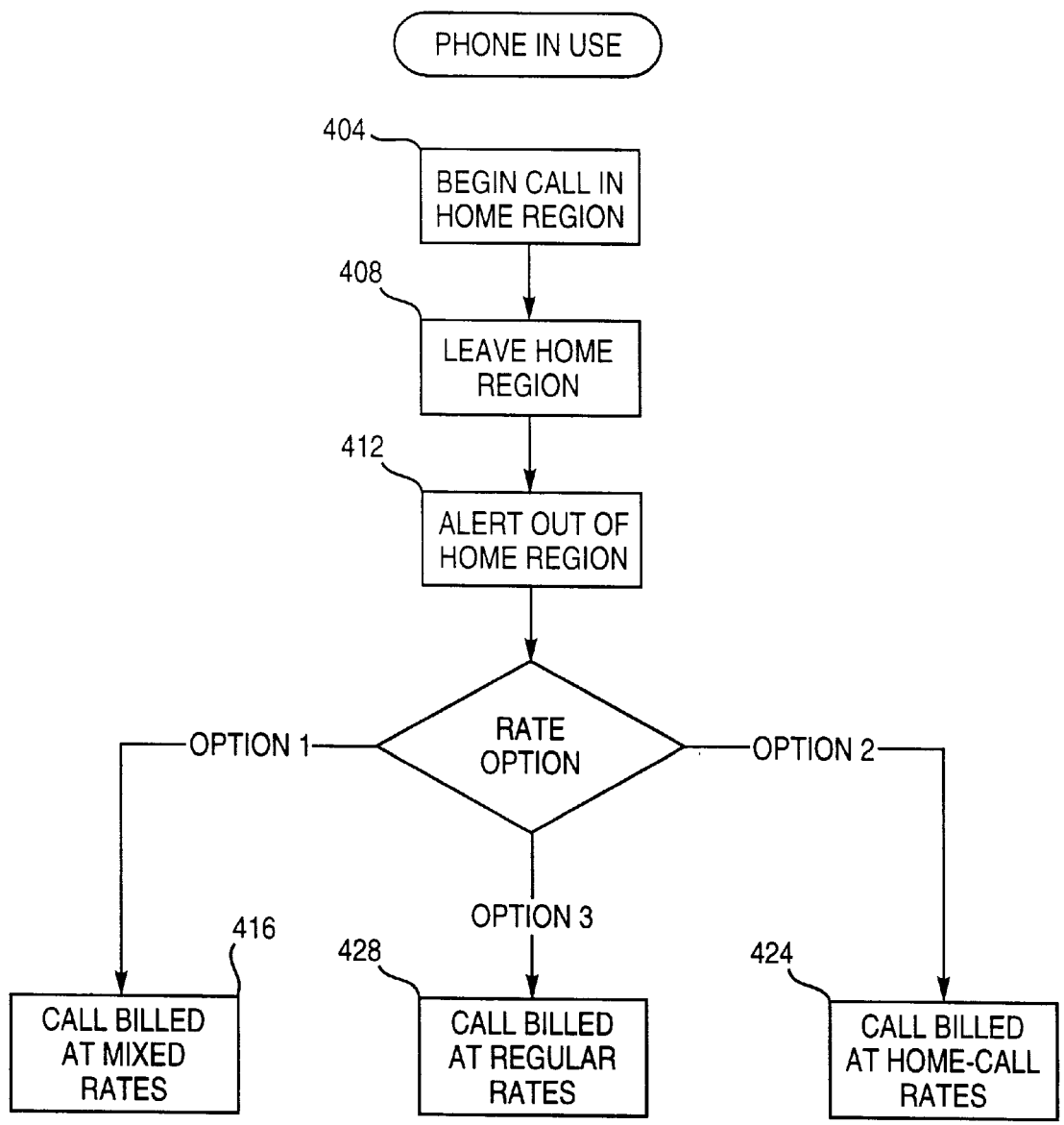
FIG. 4 is an operational flow diagram illustrating a process for providing home region rates to a subscriber as the subscriber travels into or out of his or her home region according to several embodiments of the invention.

FIG. 4 is an operational flow diagram illustrating several options for providing home region rates to a subscriber as the subscriber travels into or out of his or her home region 108 while the handset is in use. In a step 404, the subscriber initiates a call (e.g., places or receives a call) while within his or her home region 108. In a step 408, the subscriber, while continuing with the call, leaves his or her home region 108. At this point, at least four options can be provided. In either option, the system can be configured to alert the caller that he or she is no longer within home region 108. This is illustrated in a step 412.

In the first option, in a step 416, the remainder of the call is billed at the conventional wireless rates provided by the carrier. In option two, the system remains in the home call mode and the subscriber is billed for the call at the reduced home-call rates for the duration of the call. This is illustrated by steps 416 and 424. In option three the entire call is billed at the conventional (not reduced) carrier rates. This is illustrated by step 428. Note that in scenarios where all or part of the call is billed at the conventional wireless rate, in a preferred embodiment this conventional rate is that which is normally charged by the wireless carrier to the subscriber in local calling region 104. As will be apparent to one of ordinary skill in the art, this conventional rate can also be varied or adjusted when utilized in the scenarios and options described in this document.

A fourth option, not illustrated, is that the call is dropped when the subscriber leaves his or her home region. In one embodiment, the call continues until the handset is out of range of the home base station before being dropped. This fourth option may be the least preferable as most subscribers would prefer one of the above-described three options to having their calls terminated.

Figure 5:
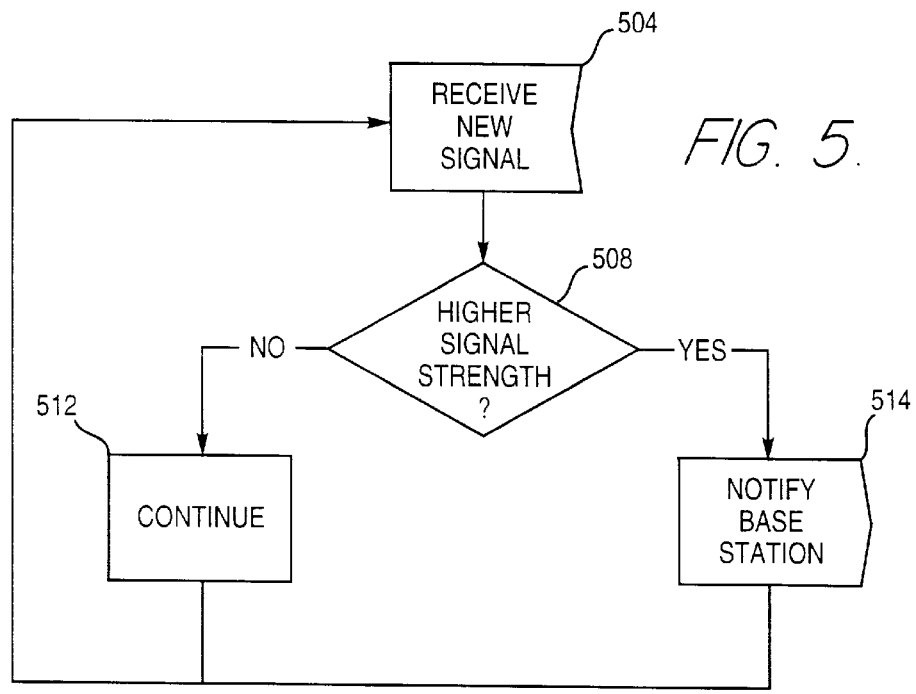
FIG. 5 is an operational flow diagram illustrating a process to determine whether the handset has left its home region according to one embodiment of the invention.

FIG. 5 is an operational flow diagram illustrating a process used to determine whether the handset has left its home region 108 and to notify the subscriber of such a change according to one embodiment of the invention. In a step 504, the handset may receive a new signal from a different base station in a handoff region. In a step 508, the handset or base station can determine whether the call should be handed-off to the new base station. In one embodiment, this determination can be made at the handset. In this embodiment, this can be accomplished by the handset determining whether the new signal has a higher signal strength than the current base-station signal.

If a handoff is not made, the handset continues to communicate with the base station in the home region 108 as illustrated by step 512. Alternatively, if the handoff is made, the handset notifies the base station that it is going to transition to the new base station as indicated by a step 514. In one embodiment, this notification can be, for example, a PSMM (pilot strength measurement message) or other hand off request or signal. As would be apparent to one of ordinary skill in the art after reading this description, alternative techniques can be implemented to make a handoff determination.

Figure 6:
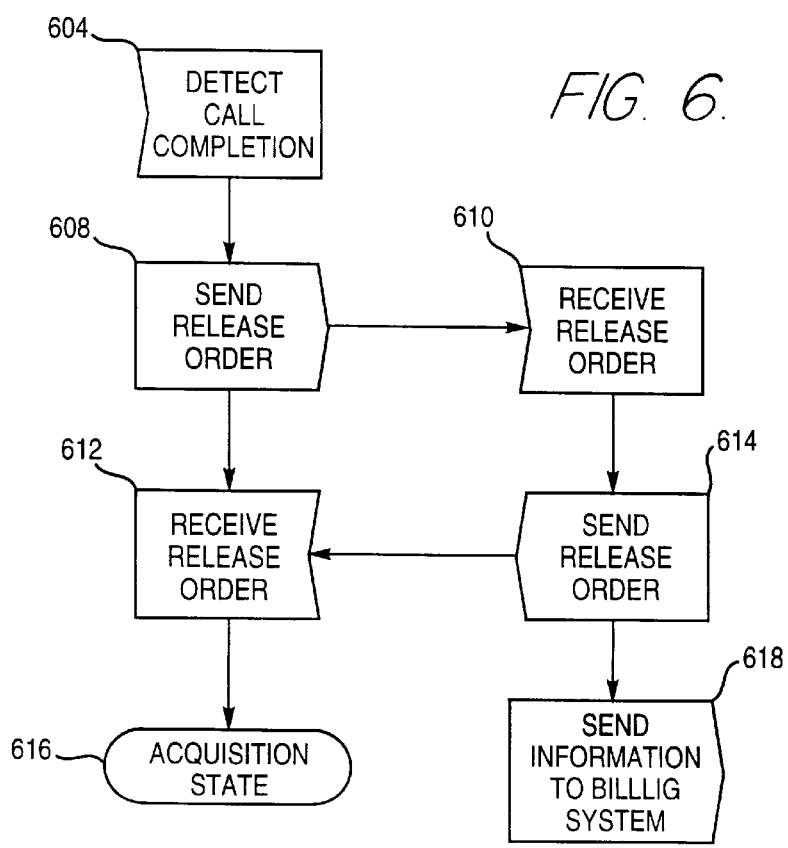
FIG. 6 is an operational flow diagram illustrating communications between a handset and a carrier system according to one embodiment of the invention.

FIG. 6 is an operational flow diagram illustrating communications between the handset and the carrier system according to one embodiment of the invention. In a step 604, the handset detects that the subscriber has ended the call. In a step 608, the handset sends a release order which is received by the active base station in a step 610. This release order is confirmed, as illustrated by steps 614 and 612. At this point, as illustrated by step 616, the handset returns to the acquisition state and can accept or be used to make new calls.

In a step 618 billing information is sent to the billing system such that the calls can be billed according to one or more of the scenarios discussed above. This billing information can include the handset or mobile ID, the parameters that were used to identify the handset's region (e.g., base station ID, sector ID, pilot offset, etc.) and the call durations associated with each parameter. In other words, sent to the billing system is information regarding the handset involved in the communication, and the duration of the call. Additionally, if applicable to the rate scheme, the duration of each portion of the call inside and outside of one or more home regions 108 is provided to the billing system. The billing system can then use this information to apply the appropriate rate or rates to the call depending on the scenario encountered and the options used as discussed above with reference to FIG. 4.

The information sent to the billing system can also include an identification of where the call was initiated, where it was terminated, and the call holding time. The determination of whether the call parameters match those for the subscriber's home region can be made by the billing server. In one embodiment, this can be done using a simple table lookup. In an alternative embodiment, the determination of whether the call parameters match those for the subscriber's home region can be made by the handset. This can be accomplished, for example, by comparing the locational parameters from the active base station to those stored locally in the handset.

Figure 7:
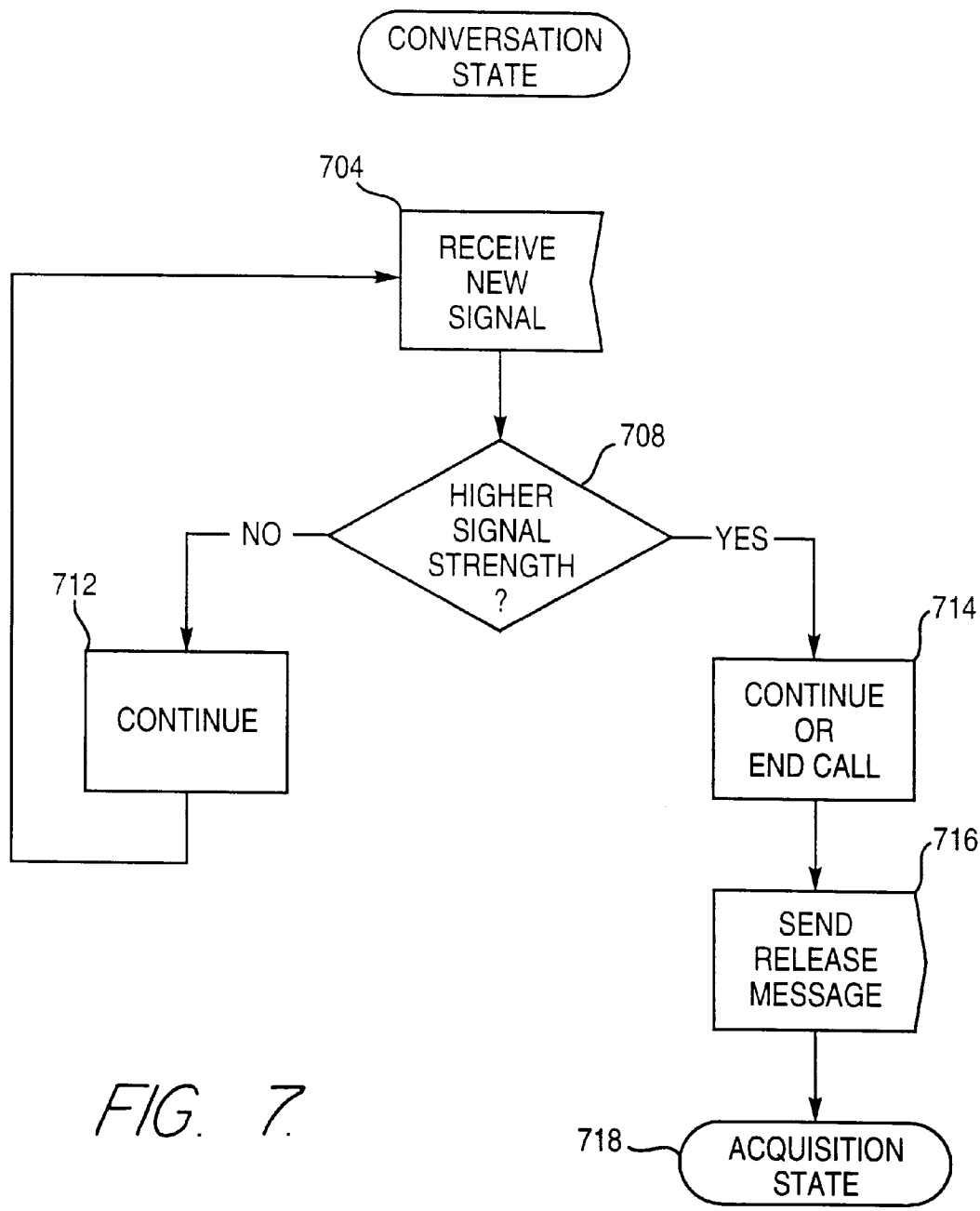
FIG. 7 is an operational flow diagram illustrating a process by which a call can be dropped as a subscriber leaves his or her home region according to one embodiment of the invention.

Discussed above and referred to as option 4, was an option where the call is dropped if the subscriber travels outside of his or her home region. FIG. 7 is an operational flow diagram illustrating a process by which this option can be implemented according to one embodiment of the invention. As the subscriber travels outside of his or her home region, his or her handset continues to receive a signal from a base station, as illustrated by step 704. The handset determines whether the signal is still from the home base station, or from another nearby base station. Specifically, in a step 708, the handset or base station can determine whether the call should be handed-off to the new base station. In one embodiment, this determination can be made at the handset. In this embodiment, this can be accomplished by the handset determining whether the new signal has a higher signal strength than the current base-station signal. If the new signal is not of higher signal strength, the call continues as illustrated by step 712 until a new signal is received. If the signal strength of the new signal is higher, indicating that the subscriber has left his or her home region, the call is ended in step 714. A notification is sent to the base station in a step 716 indicating that the call has been terminated and the handset enters an acquisition state 718. As stated above, the call does not need to be ended immediately, but may be allowed to continue until the handset is out of range of the home base station.

The process illustrated and described above with reference to FIG. 6 can be used to detect call completion, complete the release, and send the appropriate billing information to the billing server. Again, the billing server computes the rates for the call based on the region in which the call was made. Because the call was made entirely within home region 108, the billing server bills this call accordingly. Again, this billing information and a determination as to whether the call should be billed in the home region 108 or outside of home region 108 can be made within the billing server. Alternatively, the handset can itself keep track of whether it is inside or outside of its home region, and provide this information to billing server for rate computations.

Figure 8:
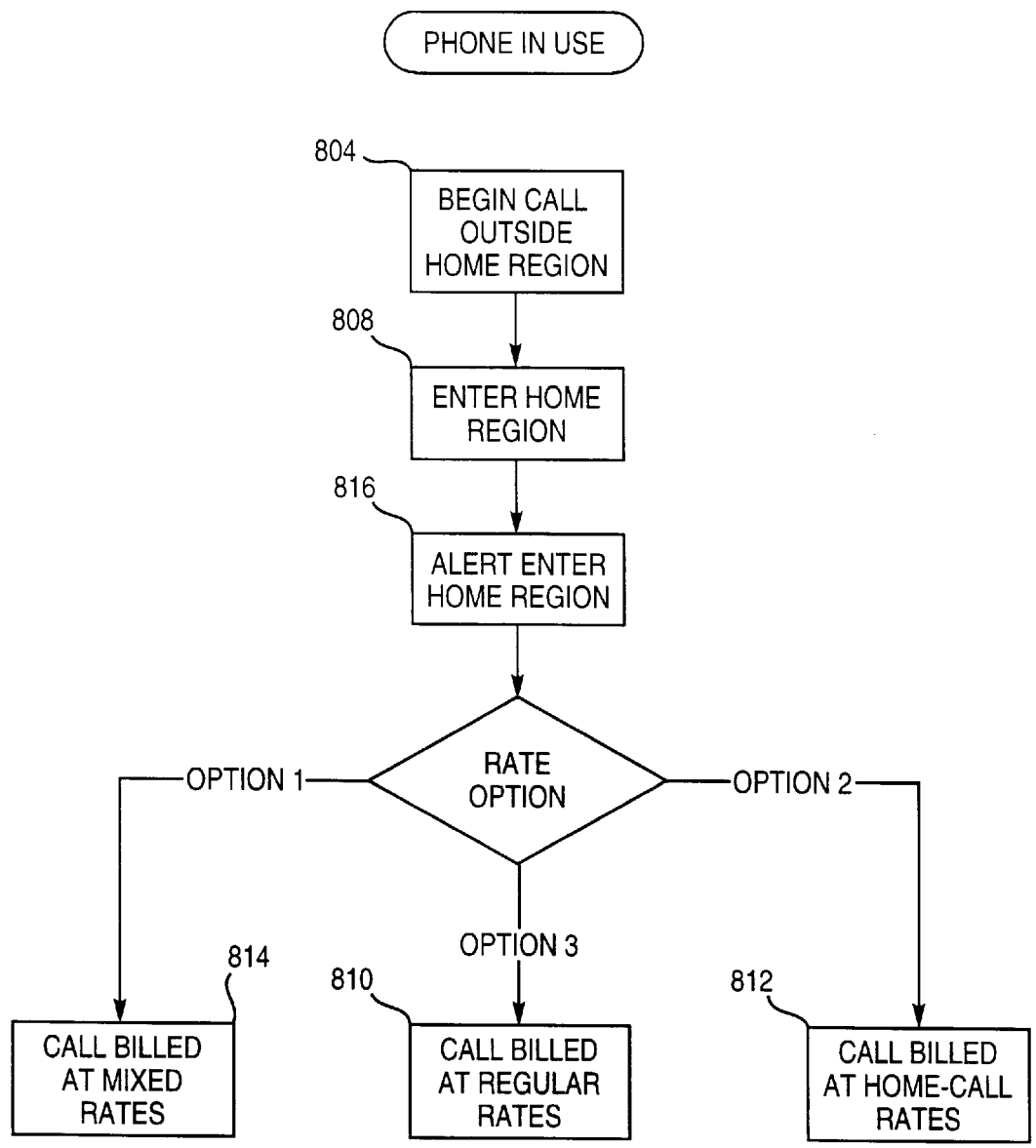
FIG. 8 is an operational flow diagram illustrating several embodiments for implementing a scenario where a call is initiated outside of the subscriber's home region and the subscriber subsequently enters his or her home region according to one embodiment of the invention.

FIG. 8 is an operational flow diagram illustrating several options for handling the scenario where a call is initiated outside of the subscriber's home region 108 and the subscriber subsequently enters his or her home region 108 while the call is in process. Referring now to FIG. 8, in a step 804, the call begins outside of the subscriber's home region 108. In a step 808, the subscriber enters his or her home region 108. As with the scenario where the caller leaves his or her home region 108, the appropriate alert can be provided that the caller has entered his or her home region 108, as illustrated by step 816. Although the alert is not necessary in any of these discussed scenarios or options, it is useful to provide the subscriber with an indication of whether he or she is within his or her home region 108.

At least three options can be provided to address this scenario. These options can include: billing the subscriber for the entire call at conventional wireless rates that apply outside of home region 108, as illustrated by step 810; billing the subscriber for the entire call at home call rates, as illustrated by step 812; and billing the subscriber at mixed rates reflecting the proportion of the call that was inside and outside of home region 108; as illustrated by step 814.

The processes described above with reference to FIGS. 5 and 6 can also be used to illustrate the manner in which the handset and the base station process the parameters and provide this information to the billing system so that the call can be billed accordingly. As discussed above with reference to FIGS. 5 and 6, the handset keeps track of the parameters identifying the region in which the call is made, and the duration of the call in each of these regions such that this information can be provided to the billing system to bill appropriately for the call. Alternatively, messaging during the call can be made from the handset to the base station and billing system to provide parameters and durations as the call is in process, and as the subscriber travels from one region to another.

Depending on the manner in which home regions 108 are defined by the wireless carrier, it is possible that a subscriber's home region 108 is located in a handoff region between two or more base stations. In this scenario, the home region can be defined as one or more of the regions associated with this handoff scenario. It should be noted that administrative difficulties may arise in this scenario, depending on the carriers involved with providing the wireless services. For example, consider the situation in which the handoff region is between two regions being served by two different carriers, and the subscriber initiates a wireless phone call. Depending on the circumstances, either of the two carriers whose base stations cover the home region may pickup the call. If it is the subscriber's carrier, then the call can be billed at home call rates. If, on the other hand, the other carrier handles the call, steps may be needed to allow the call to be billed at home call rates for that subscriber. For example, cross agreements may be implemented among carriers to recognize each others' home subscribers in the handoff regions. In this scenario, data can be exchanged among the carriers identifying the subscribers and their home regions.

As discussed above, it is possible to have more than one home region 108 for one or more subscribers of the wireless service. As with the single home region embodiments discussed above, the identification of which parameters identified that the handset is in a home region can be done within the handset, or at the base station or central office.

Figure 9:
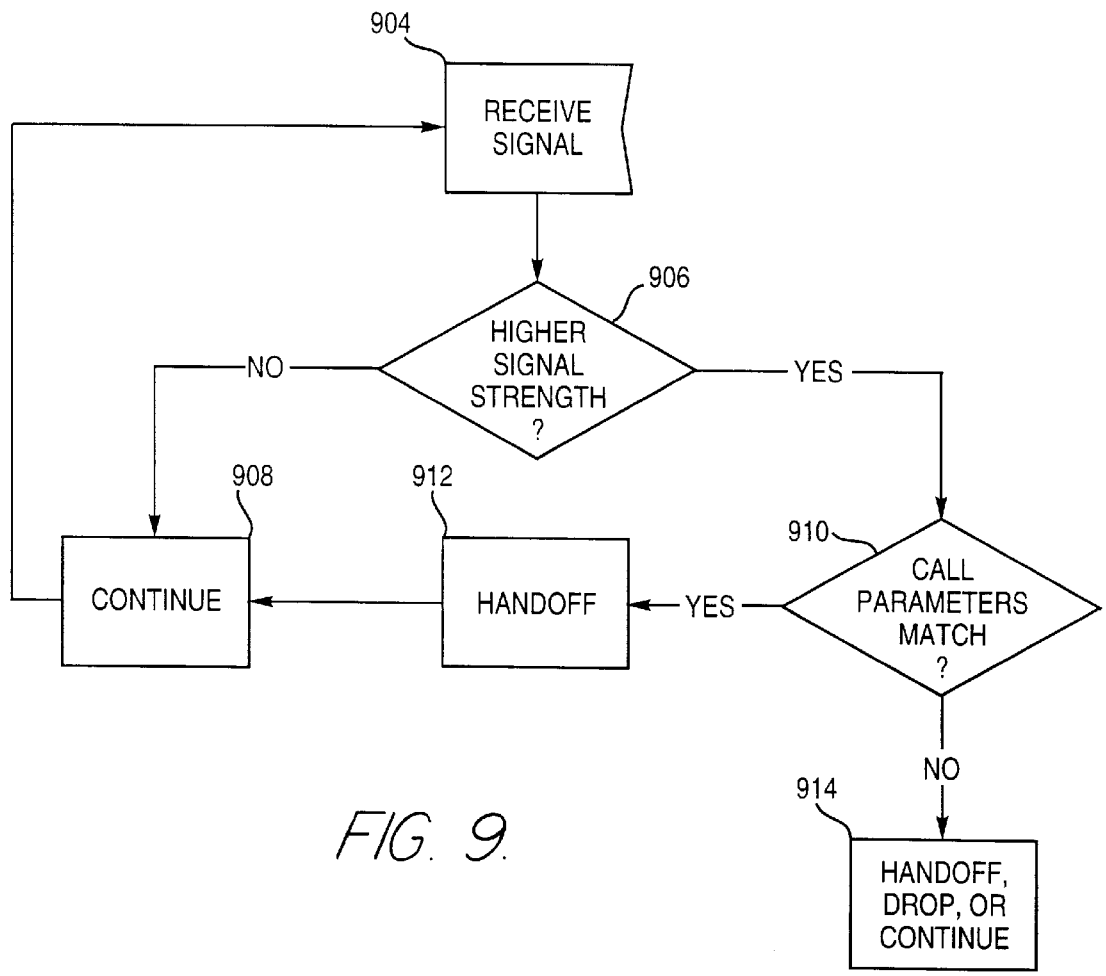
FIG. 9 is an operational flow diagram illustrating a process for handling calls in a scenario where the subscriber may have multiple home regions according to one embodiment of the invention.

FIG. 9 is an operational flow diagram illustrating a process for handling calls in a scenario where the subscriber may have multiple home regions. Referring now to FIG. 9, as the subscriber travels outside of his or her home region, his or her handset continues to receive a signal from a base station, as illustrated by step 904. In a step 906, the handset or base station can determine whether the call should be handed-off to the new base station, for example by determining whether the new signal has a higher signal strength than the current base-station signal. If the new signal is not of higher signal strength, the call continues as illustrated by step 908 until a new signal is received. If the signal strength of the new signal is higher, indicating that the subscriber has left his or her initial home region, the call parameters are checked to determine whether the subscriber is now in another home region. This is illustrated by step 910.

Where the subscriber is in another home region, the call is handed off and continues as illustrated by steps 912 and 908. Where the subscriber is no longer in a home region, one of the four options discussed above with reference to FIGS. 4–7 can be applied as illustrated by a step 914.

In both the single and multiple home region embodiments, it is possible that the handset receives the system parameters from the base station and prepares those parameters to information stored in the handset to determine whether it is within its home region. In one embodiment, the handset receives base station ID and sector ID from a paging channel to make this determination. In embodiments where the parameters identifying a handset's home region are stored locally on the handset, the identification of the home region 108 can be changed remotely.

Figure 10:
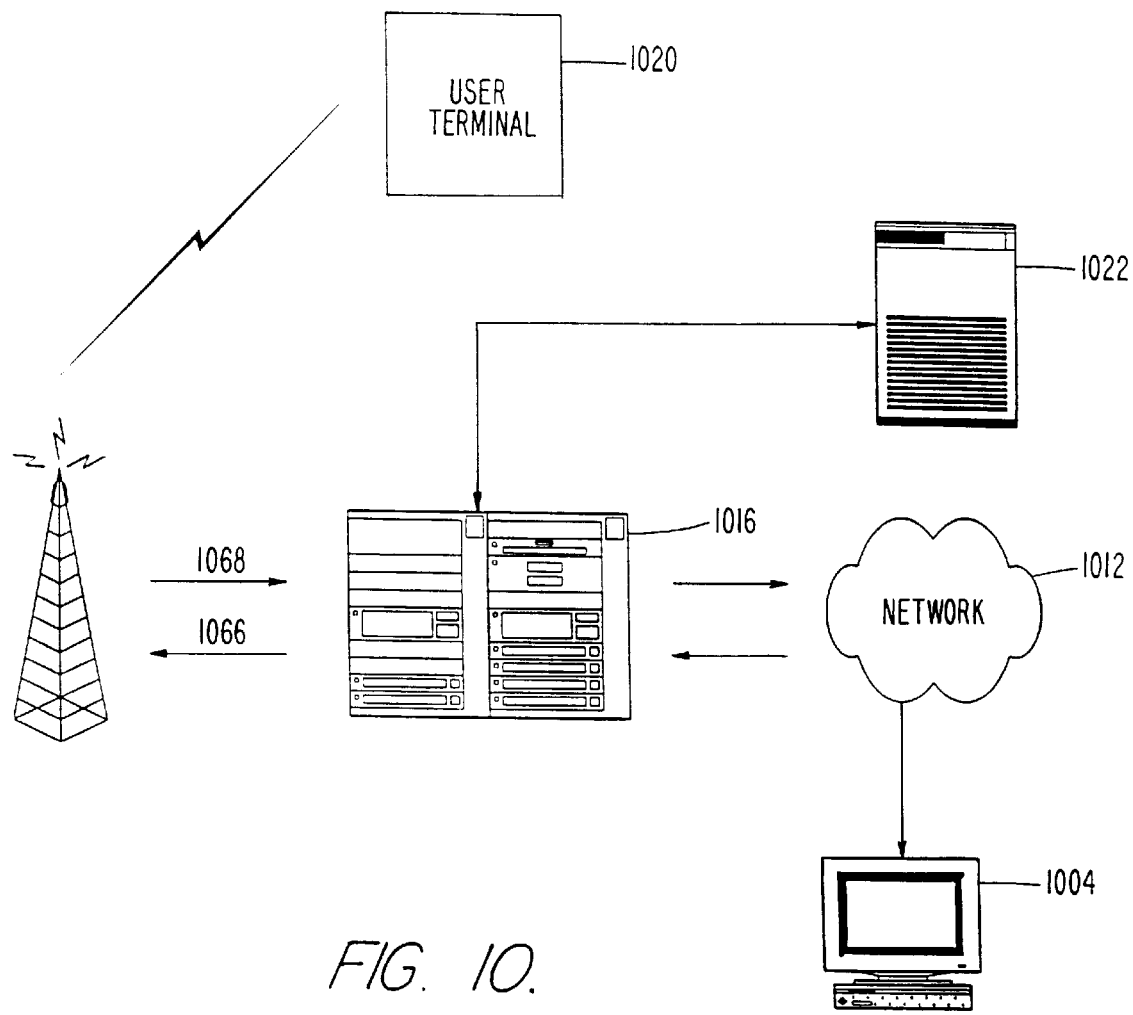
FIG. 10 is a diagram illustrating an example implementation of a wireless carrier system according to one embodiment of the invention.

An example implementation suitable for making such a configuration change is illustrated in FIG. 10. The system in FIG. 10 includes a customer service terminal 1004 interfaced to the mobile service center computers 1016 by a network 1012 or other interface. If a subscriber or other authorized party wishes to change the identified home region 108 for that subscriber, this information can be entered by a customer service representative at customer service terminal 1004. This information is provided to the mobile servicing computers 1016 such that the change can be implemented. The mobile servicing computers 1016 provide a configuration change message 1066 to the handsets 1020 via normal communication channels. Handset 1020 acknowledges this configuration change by an acknowledgment message 1068 sent back to mobile service computers 1016. Additionally, billing system 1022 can be informed of the change, as well.

As stated above, an additional region, referred to as home perimeter region 110, can be defined to provide a second tier of rate reductions with the home call service. In one embodiment, this second tier of rate reductions provides wireless service carrier rates at rates which are competitive with those of conventional land line service providers.

Although the scenarios and options described above are discussed with reference to a transition between local calling region 104 and home region 108, any or all of these same scenarios and options can be used to provide transitions between home regions 108 and home-perimeters 110, or from local calling region 104 to home-perimeter region 110.

As stated above, in one embodiment of the invention, one or more home-perimeter regions 110 can be implemented in place of, or in addition to, one or more home regions 108. Home-perimeter region 110 can be a region that is more narrowly defined about the perimeter of the subscriber's home, office, or other designated location or area. In one embodiment of the invention, home-perimeters regions 110 cover a similar area to that which could otherwise be covered by conventional land line equipment. However, it is not necessary that home-perimeter regions 110 be defined similar to regions supported by land line equipment. As would be apparent to one of ordinary skill in the art after reading this description, home-perimeter regions 110 can be otherwise defined.

Figure 11A:
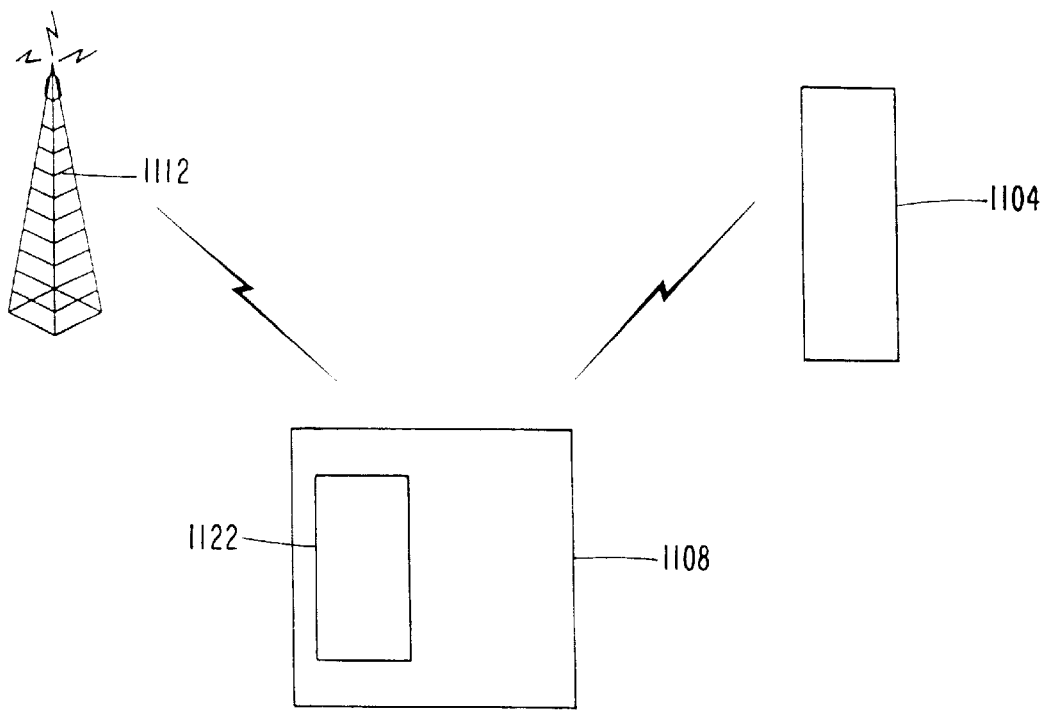
FIG. 11A is a diagram illustrating an example implementation of a docking station and handset in a home-perimeter region according to one embodiment of the invention.

FIG. 11A is a diagram illustrating an example apparatus that can be implemented to provide home-perimeter service in a home-perimeter region 110. The apparatus illustrated in FIG. 11A includes a handset 1004 and a docking station 1108. Handset 1104 can be connected to docking station 1108 via a wired or a wireless connection. The wireless connection between handset 1104 and docking station 1108 can be implemented as that of conventional cordless telephones such as, for example, the currently available conventional 900 Mhz analog or digital phones or other wireless communications interface. Docking station 1108 can communicate with the base station 1112 via the standard wireless carrier interface. In one embodiment, docking station 1108 communicates with base station 1112 as if it were a wireless telephone.

In one embodiment, the subscriber utilizes handset 1104 to place or receive (i.e., initiate) a call. This call initiated through handset 1104 is communicated via docking station 1108 to base station 1112. All calls made through docking station 1108 in this manner are considered home-perimeter region calls in one embodiment of the invention.

In one embodiment, handset 1104 is separate from the handset that the subscriber usually uses for wireless communications through his or her wireless service provider. In this embodiment, handset 1104 is a special-purpose handset used only for communications via docking station 1108, or similar docking station or relay devices. For example, in one embodiment, handset 1104 can be a conventional wired or cordless telephone handset. In an alternative embodiment, handset 1104 can also communicate with a docking station to interface to the landline service provider.

In one embodiment, docking station 1108 includes a cradle for both handset 1104 and the subscriber's wireless phone 1122 so that both can be charged by base station 1108. In one embodiment, communications between docking station 1108 and base station 1112 are made by the communications transceiver housed within the subscriber's wireless phone. Alternatively, an additional wireless transceiver can be provided in docking stations 1108 such that docking station 1108 can communicate with base station 1112 without the subscriber's wireless handset having to be present.

The combination of handset 1104 and docking station 1108 can, for example, be implemented utilizing a conventional cordless telephone or a hard-wired conventional telephone modified to have a wireless communications interface operable between the base portion (i.e., docking station 1108) and base station 1112. Similarly, a separate communications module can be implemented to plug into the conventional telephone such that the telephone can now communicate with base station 1112. In this alternative embodiment, an off-the-shelf telephone can simply be plugged into the module to allow the subscriber to use the wireless service.

In another embodiment, handset 1104 is the same handset used by the subscriber for making his or her normal wireless calls in local calling region 114. In one implementation of this embodiment, whenever the subscriber is within the range of docking station 1108, calls made using handset 1104 are made through the wireless service provider, but are billed out at the home-perimeter region calling rates. Thus, in this embodiment, the area of coverage for the home-perimeter region 110 is defined by the area of coverage between handset 1104 and docking station 1108.

In one embodiment, in order to differentiate that this is a call initiated within the home-perimeter region, an origination message or paging response message can be transmitted by docking station 1108 to base station 1112. This message can include special service option numbers to identify to the billing system that the call should be billed at the home-perimeter rate. As would be apparent to one of ordinary skill in the art after reading this description, just about any flag, message, or other identification can be included in the communications stream to identify to the service provider's processing equipment that the call is a call made within the home-perimeter region.

Although illustrated as including a cradle for both handset 1104 and the subscriber's wireless telephone, the docking station 1108 need not include facilities to house and/or recharge the wireless telephone 1122. Instead, in one embodiment, docking station 1108 is a dedicated piece of equipment that is used only to allow the subscriber to place wireless-carrier calls at home-perimeter rates using a hard wired or cordless handset 1104.

Although handset 1104 is described as a hard wired or wireless handset, similar to those used for conventional land line services, it would be apparent to one of ordinary skill in the art after reading this description how alternative 'telephone' devices can be implemented to perform the functions of docking station 1108 and handset 1104 while allowing communication to base station 1112 using the wireless service provider.

Figure 11B:
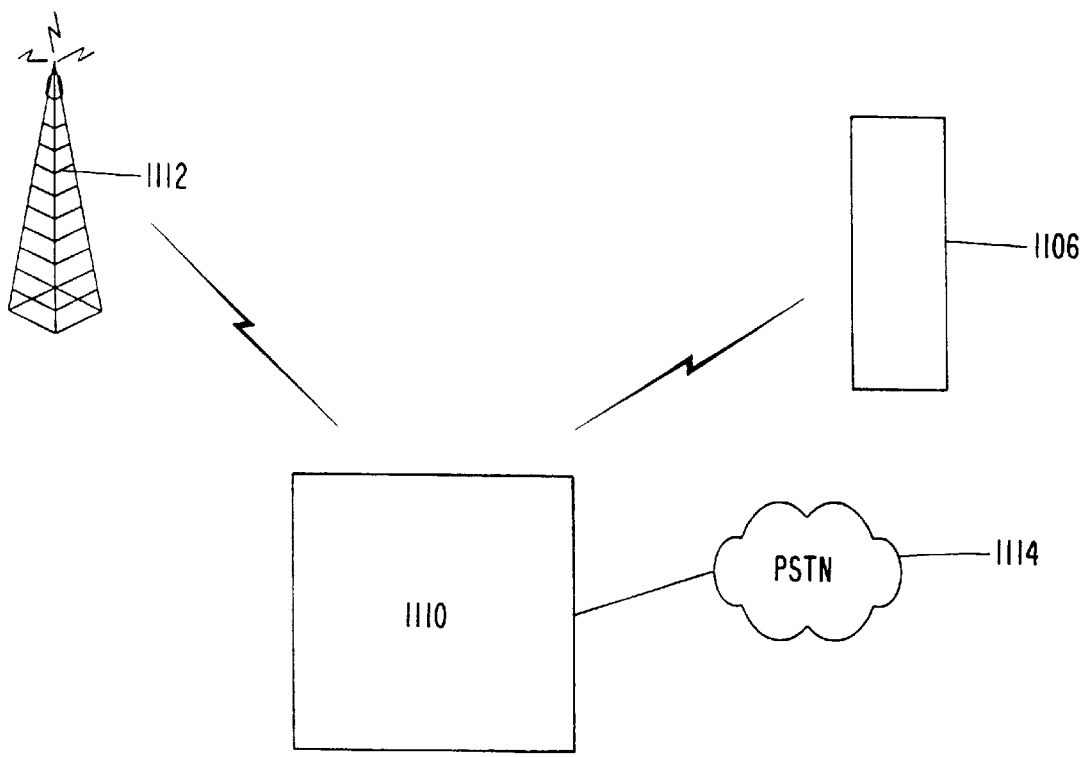
FIG. 11B is a diagram illustrating a base station that can be interfaced with both the wireless service provider and the land line service provider according to one embodiment of the invention.

FIG. 11B is a diagram illustrating an alternative implementation of docking station 1008 that allows the subscriber to select whether he or she wishes to use the wireless service provider, or conventional land line services. Referring now to FIG. 11B, docking station 1110 has a dual-communications capability. That is, docking station 1110 can communicate with base station 1112 to provide wireless services or with the public switched telephone network (PSTN) 1114 to provide conventional land line services. A handset or corded phone 1106 interfaces with docking station 1110 to allow the subscriber to initiate calls using either the wireless service or the land line service. As with the embodiment illustrated in FIG. 11A, handset 1106 can communicate with docking station 110 using a hard wired or a cordless arrangement. In a preferred embodiment, handset 1106 communicates with docking station 1110 using a 900 Mhz signal similar to that used in many contemporary conventional telephone handset/cradle pairs. Handset 1106 can be the same handset as handset 1104 described above with reference to FIG. 11A.

In order to allow the subscriber to select whether he or she wishes to use land line or wireless services, additional hardware or software can be included. For example, a simple switch on docking station 1110 can allow the subscriber to manually select the routing of the call. In another alternative embodiment, a keystroke command implementing by depressing one or more keys on the handset's touch-tone keypad can allow the subscriber to select whether he or she ultimately wishes to have the call routed through the land line service or the wireless carrier. As would be apparent to one of ordinary skill in the art after reading this description, alternative techniques can be provided to allow the subscriber to select which service he or she desires to use for any given phone call. Similar to the docking station described above in FIG. 11A, docking station 1110 can include facilities for charging and for storing handset 1106, as well as the subscriber's wireless telephone 1122. Additionally, docking station 1110 can include its own transceiver or transceivers to provide communications to base station 1012 or public switch telephone network 1114. Again, the range of handset 1106 with respect to docking station 1110 can be used in one embodiment to define the area of coverage of home-perimeter region 110.

Thus, in the embodiments described above and illustrated with reference to FIGS. 11A and 11B, the wireless service provider can provide a wireless local loop-like service at the subscriber's home, office, or other designated location. In one embodiment, the use of reserved service option numbers are used by the carrier's network to detect that the call is being made from the subscriber's home-perimeter region 110.

In one embodiment of the invention, docking station 1108, 1110, can be included with a conventional phone jack such that the subscriber can simply plug his or her existing or conventional telephone (wired or cordless) into docking station 1108 or docking station 1110. As such, the subscriber can use his or her land line telephone to make calls using the wireless service provider at home-perimeter region rates. Thus, in one embodiment, home-perimeter calling can be implemented simply by providing the wireless customer with a charging cradle for his or her wireless phone 1122 that includes a phone jack and either a separate transceiver for communicating with base station 1112 or a means for routing a call through the transceiver of the wireless telephone 1122 to base station 1112. Thus, it can be seen that using this embodiment, a wireless service provider can offer its subscribers the ability to take advantage of home-perimeter rates, competitive with land line rates, without the need for the subscriber to replace his or her existing conventional telephone equipment, and without rendering this conventional land line telephone equipment obsolete. The embodiment illustrated in FIG. 11B provides the additional flexibility of allowing the subscriber to choose which of the two services he or she prefers to use for any given call.

Figure 12:
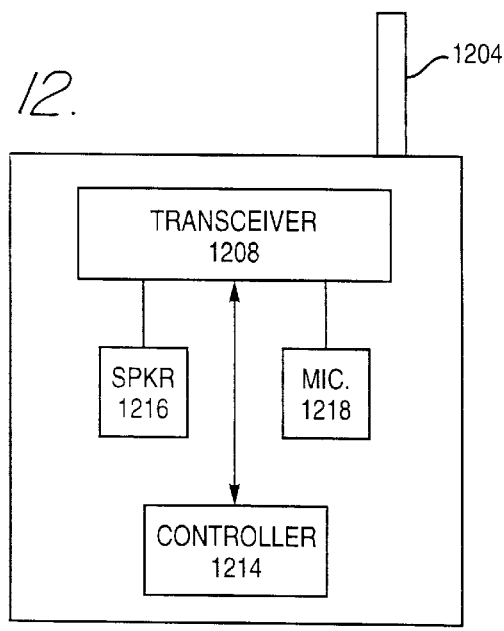
FIG. 12 is a diagram illustrating an example handset according to one embodiment of the invention.

FIG. 12 is a block diagram generally illustrating an example implementation for a wireless handset according to one embodiment of the invention. The example handset illustrated in FIG. 12 includes an antennae 1204, a transceiver 1208, a controller 1214, a speaker 1216, and a microphone 1218. Transceiver 1208 can include, for example, a transmitter to transmit the signals to a base station and a receiver to receive signals from the base station. Transceiver 1208 can also include necessary modulation, demodulation, up conversion, and down conversion circuitry necessary to allow a voice or other data communications to be communicated from the handset to the base station and vice versa. Speaker 1216 provides audible information to the subscriber including voice information from another party participating in a phone call, as well as tones, alerts, or other audible information. Microphone 1218 accepts voice input from the subscriber and provides this input to transceiver 1208 such that the subscriber's voice can be transmitted to the other party via the base station.

Controller 1214 can be implemented using a processor, state machine, or other controller device. Controller 1214 can be implemented to control one or more functions of the handset including, for example, controlling a display (not illustrated), power control, enhanced features such as autodial, hot keys, directories, and other features, and also control other aspects of the handset. In one embodiment, controller 1214 is used to make a determination as to whether the handset is within the subscriber's home region 108. In one embodiment, this determination can be made using a table lookup where received locational parameters are compared with a stored referenced indicating the home region. If the comparison of the locational parameters to the stored reference indicates that the handset is in the home region, this information can then be provided via transceiver 1208 to the wireless carrier's central office or billing system such that the call can be billed appropriately. In an alternative embodiment, controller 1214 can receive the locational parameters from transceiver 1208 and provide these parameters to a comparator that compares these parameters to a stored reference to determine whether the handset is within home region 108. As would be apparent to one of ordinary skill in the art after reading this description, alternative techniques for utilizing locational parameters to determine whether the handset is within a home region 108 can be implemented utilizing hardware, software, or a combination thereof. Although not illustrated, user interfaces such as a keypad and display can also be provided with the handset.

Figure 13:
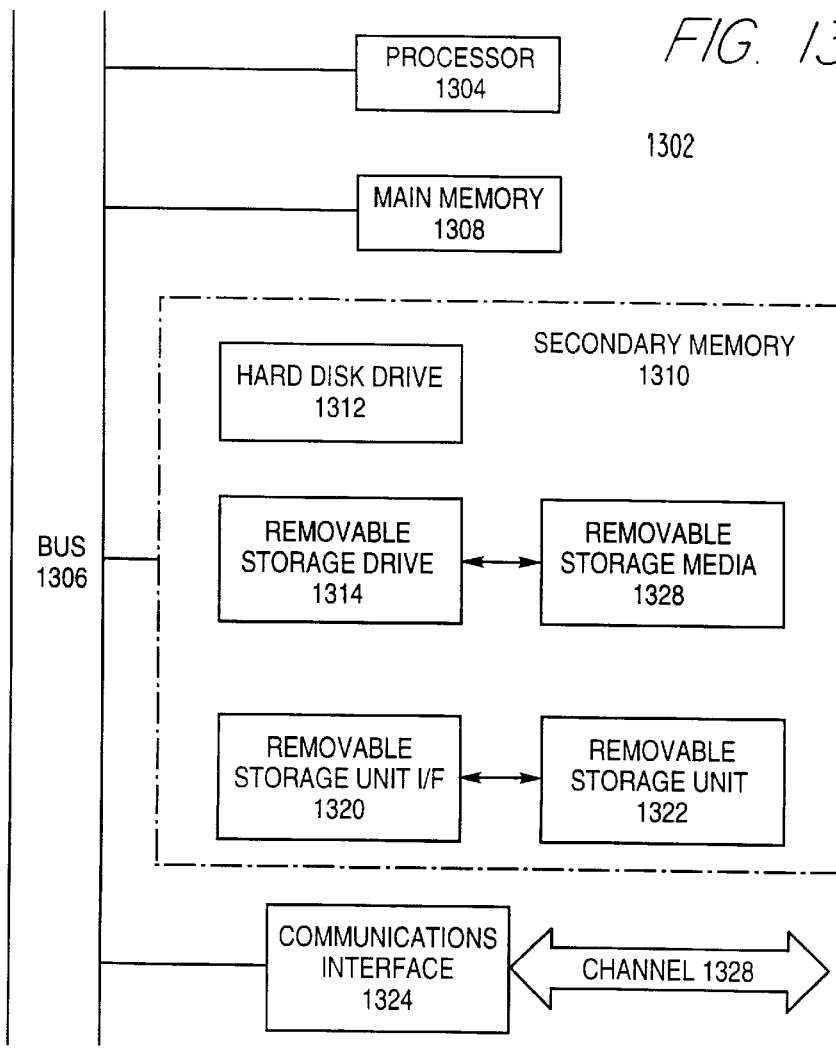
FIG. 13 is a diagram illustrating an example computer system according to one embodiment of the invention.

The various embodiments, systems and subsystems of the invention described above may be implemented using hardware, software or a combination thereof and may be implemented in a computer system or other processing system. In fact, in one embodiment, these elements are implemented using a computer system capable of carrying out the functionality described with respect thereto. An example computer system 1302 is shown in FIG. 13. The computer system 1302 includes one or more processors, such as processor 1304. The processor 1304 is connected to a communication bus 1306. Various software embodiments are described in terms of this example computer system. After reading this description, it will become apparent to a person skilled in the relevant art how to implement the invention using other computer or processor systems and/or architectures. The functionality of the invention as described above is not dependent on a particular computer or processor architecture.

Computer system 1302 can include a main memory 1308, preferably random access memory (RAM), and can also include a secondary memory 1310. The secondary memory 1310 can include, for example, a hard disk drive 1312 and/or a removable storage drive 1314, representing a floppy disk drive, a magnetic tape drive, an optical disk drive, etc. The removable storage drive 1314 reads from and/or writes to a removable storage medium 1318 in a well known manner. Removable storage media 1318, represents a floppy disk, magnetic tape, optical disk, etc. which is read by and written to by removable storage drive 1314. As will be appreciated, the removable storage media 1318 includes a computer usable storage medium having stored therein computer software and/or data.

In alternative embodiments, secondary memory 1310 may include other similar means for allowing computer programs or other instructions to be loaded into computer system 1302. Such means can include, for example, a removable storage unit 1322 and an interface 1320. Examples of such can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1318 to computer system 1302.

Computer system 1302 can also include a communications interface 1324. Communications interface 1324 allows software and data to be transferred between computer system 1302 and external devices. Examples of communications interface 1324 can include a modem, a network interface (such as, for example, an Ethernet card), a communications port, a PCMCIA slot and card, etc. Software and data transferred via communications interface 1324 are in the form of signals which can be electronic, electromagnetic, optical or other signals capable of being received by communications interface 1324. These signals are provided to communications interface via a channel 1328. This channel 1328 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 1318, a disk capable of installation in disk drive 1312, and signals on channel 1328. These computer program products are means for providing software or program instructions to computer system 1302.

Computer programs (also called computer control logic) are stored in main memory and/or secondary memory 1310. Computer programs can also be received via communications interface 1324. Such computer programs, when executed, enable the computer system 1302 to perform the features of the present invention as discussed herein. In particular, the computer programs, when executed, enable the processor 1304 to perform the features of the present invention. Accordingly, such computer programs represent controllers of the computer system 1302.

In an embodiment where the elements are implemented using software, the software may be stored in, or transmitted via, a computer program product and loaded into computer system 1302 using removable storage drive 1314, hard drive 1312 or communications interface 1324. The control logic (software), when executed by the processor 1304, causes the processor 1304 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A system for implementing a flexible rate plan for one or more wireless services subscribers, comprising:

a plurality of base stations in a local calling area configured to relay communications between a plurality of subscribers and a communications network, each base station having one or more locational parameters associated therewith;

a wireless handset configured to communicate with said base stations and to receive said one or more locational parameters from said base station, said wireless handset further configured to determine whether it is within a home region within said local calling area and whether it is within a home perimeter within said home region, wherein said determination is based on said locational parameters received from said base station;

a billing system configured to receive information indicating whether the handset is within said home region and whether it is within a home perimeter within said home region, and to bill the subscriber for the call at reduced rates depending on whether the subscriber is within the home region and whether the subscriber is within said home perimeter.

2. The system of claim 1, wherein said locational parameters include at least one of the group of a base station ID, a sector ID, or a pilot offset.

3. The system of claim 1, wherein said handset comprises a receiver to receive the locational parameters and a controller to compare the received locational parameters with a stored reference to determine whether the handset is within the home region and whether it is within said home perimeter within said home region.

4. The system of claim 1 further comprising a docking station, said docking station including a first cradle for storing said handset and a second cradle for storing a second handset, wherein said second handset communicates with said base station via said docking station, and wherein calls initiated by the subscriber using said second handset are billed at further reduced rates.

5. A system for implementing a flexible rate plan for a wireless communications subscriber, said system comprising the steps of:

means for determining whether said subscriber is within a home region and whether said subscriber is within a home perimeter within said home region within a local calling region;

means for notifying a central office regarding whether said subscriber is within said home region and whether said subscriber is within said home perimeter;

means for determining a rate for billing the subscriber for the call based on whether the subscriber is within the home region and whether the subscriber is within the home perimeter.

6. The system of claim 5, wherein said means for determining whether a subscriber is within a home region comprises:

means for receiving locational parameters at a handset from a base station with which said handset is communicating; and means for checking said locational parameters to determine whether the handset is within the home region and whether it is within the home perimeter.

7. The system of claim 6, further comprising means for generating an alert indicating that the subscriber has left the home region or the home perimeter.

8. The system of claim 7, wherein said locational parameters comprise at least one of the group of cell site ID, base station ID, sector ID, and pilot offset.

9. The system of claim 5, wherein said rate for billing the subscriber is maintained at a reduced rate where the call is at least in part conducted in the home region, and said rate for billing the subscriber is maintained at a further reduced rate where the call is at least in part conducted in the home perimeter region.

10. The system of claim 5, wherein three rates are established for the subscriber, depending on whether the subscriber is in the home perimeter region, the home region, or the local calling area.

11. The system of claim 10, wherein said rate for billing the subscriber in the home region is different from normal subscriber rates in the subscriber's local calling region.

12. The system of claim 10, wherein said rate for billing the subscriber in the home perimeter is different from the rate for billing the subscriber in the home region, and is different from normal subscriber rates in the subscriber's local calling region.

* * * * *